(12) United States Patent
Wada et al.

(10) Patent No.: US 7,378,036 B2
(45) Date of Patent: May 27, 2008

(54) FERRITE MATERIAL AND ELECTRONIC COMPONENT USING THE SAME

(75) Inventors: Ryuichi Wada, Tokyo (JP); Takuya Aoki, Tokyo (JP); Atsuhito Matsukawa, Tokyo (JP); Kensaku Asakura, Tokyo (JP)

(73) Assignee: TDK Corporation, Tokyo (JP)

( * ) Notice: Subject to any disclaimer, the term of this patent is extended or adjusted under 35 U.S.C. 154(b) by 409 days.

(21) Appl. No.: 11/258,269

(22) Filed: Oct. 26, 2005

(65) Prior Publication Data

US 2006/0116283 A1 Jun. 1, 2006

(30) Foreign Application Priority Data

Nov. 29, 2004 (JP) .............................. 2004-343984

(51) Int. Cl.
*H01F 1/34* (2006.01)

(52) U.S. Cl. ................ 252/62.6; 252/62.62; 252/62.59; 333/185; 336/117; 336/221; 336/233; 336/234

(58) Field of Classification Search ............... 252/62.6, 252/62.62, 62.59; 336/117, 221, 233, 234; 333/185

See application file for complete search history.

(56) References Cited

FOREIGN PATENT DOCUMENTS

| JP | 9-306716 | 11/1997 |
|---|---|---|
| JP | 11-35369 | 2/1999 |
| JP | 2002-141215 | 5/2002 |
| JP | 2002-255637 | 9/2002 |
| JP | 2003-272912 | 9/2003 |

OTHER PUBLICATIONS

U.S. Appl. No. 11/468,599, filed Aug. 30, 2006, Wada et al.

*Primary Examiner*—Melissa C. Koslow
(74) *Attorney, Agent, or Firm*—Oblon, Spivak, McClelland, Maier & Neustadt, P.C.

(57) ABSTRACT

A ferrite material of the present invention is configured such that 0.05 to 1.0 wt % of bismuth oxide in terms of $Bi_2O_3$, 0.5 to 3.0 wt % of tin oxide in terms of $SnO_2$, and 30 to 5000 wt ppm of chromium oxide in terms of $Cr_2O_3$ are added to a predetermined main component mixture composition. Therefore, it is possible to achieve an improvement in DC bias characteristics, an improvement in temperature characteristics of initial magnetic permeability, and an improvement in resistivity and further achieve an improvement in burned body strength, particularly in burned body flexural strength (bending strength).

6 Claims, No Drawings

FERRITE MATERIAL AND ELECTRONIC COMPONENT USING THE SAME

BACKGROUND OF THE INVENTION

1. Field of the Invention

The present invention relates to a ferrite material and an electronic component using it and, in particular, relates to a ferrite material for use as a material of an electronic component forming a closed magnetic circuit and to an electronic component manufactured by the use of such a ferrite material.

2. Description of the Related Art

A ferrite material as an oxide magnetic material containing Ni, Cu, Zn, or the like has excellent magnetic properties and therefore has conventionally been used as, for example, a material of magnetic cores of various electronic components, a material of inductor components such as a multilayer chip inductor, or the like.

In consideration that such magnetic cores and inductor components are used in various temperature environments, it is required that the change rate of initial magnetic permeability $\mu i$ relative to a temperature change be small, that is, the temperature characteristics of initial magnetic permeability $\mu i$ be excellent (change relative to temperature be small).

There is a tendency that an electronic component having a coil conductor such as a multilayer chip inductor has an inductance that is reduced depending on a current value when a closed magnetic circuit is formed and a direct current is supplied to the coil conductor.

As the electronic component, it is desirable that the reduction in inductance be as small as possible even when a relatively large current is supplied. Therefore, it is required that the change rate of inductance relative to a supply of direct current be small, that is, the DC bias characteristics be excellent.

Further, in the electronic component having the coil conductor such as the multilayer chip inductor, a ferrite sintered body (burned body) is required to have a high resistivity value. When the resistivity is low, there arises, for example, a disadvantage that the eddy current loss increases to degrade the Q value.

In response to such requirements, for the purpose of providing an oxide magnetic material that is used in an electronic component forming a closed magnetic circuit, that can ensure desired magnetic properties even when a large external stress is applied, and that has excellent DC bias characteristics and further providing a multilayer electronic component using such an oxide magnetic material, JP-A-2003-272912 has proposed an oxide magnetic material that is formed by adding 0.2 to 3 wt % $SnO_2$ to a Ni—Cu—Zn-based ferrite material main component having a predetermined composition. According to this, it is reported that even when a compressive stress of 40 MPa is applied, the change rate of initial magnetic permeability can be suppressed to 10% or less and further the excellent DC bias characteristics can be obtained.

Further, for the purpose of providing an oxide magnetic body porcelain composition that exhibits an extremely small change in characteristic value caused by a temperature change and simultaneously has a high resistivity and further providing an inductor component using it, JP-A-2002-255637 has proposed an oxide magnetic body porcelain composition that is formed by adding 1.5 to 3.0 weight parts of $SnO_2$, 0.02 to 0.20 weight parts of $Co_3O_4$, and 0.45 weight parts or less of $Bi_2O_3$ to a Ni—Cu—Zn-based ferrite material main component having a predetermined composition. According to this, it is reported that since the change in characteristic value due to a temperature change is extremely small and simultaneously the resistivity is high, the eddy current loss is small and thus the Q value is improved so that a high-performance electronic component can be obtained. However, there is a problem that the added substances of $Bi_2O_3$ and $SnO_2$ have low flexural strengths.

Further, for the purpose of providing an oxide magnetic material that is excellent in high-frequency performance, that has a high volume resistivity, and that can be sintered by burning at low temperature to suppress a conductor loss on the inside caused by diffusion of Ag, JP-A-2002-141215 has proposed an oxide magnetic material that is formed by adding auxiliary components of 0.5 to 2.0 weight parts of $Bi_2O_3$, 0.2 to 2.0 weight parts of $TiO_2$, and 0.1 to 1.0 weight parts of one or more kinds of $MnO_2$, $MoO_2$, $RuO_2$, $SnO_2$, $TeO_2$, $WO_2$, and $IrO_2$ to a Ni—Cu—Zn-based ferrite material main component having a predetermined composition.

However, the requirements for the improvement of various properties of the foregoing oxide magnetic materials are endless and therefore there is a demand for proposals for a ferrite material that can achieve an improvement in DC bias characteristics, an improvement in temperature characteristics of initial magnetic permeability, and an improvement in resistivity and further achieve an improvement in burned body strength, particularly in burned body flexural strength (bending strength).

The present invention has been conceived under these circumstances and has an object to provide a ferrite material that can achieve an improvement in DC bias characteristics, an improvement in temperature characteristics of initial magnetic permeability, and an improvement in resistivity of a ferrite sintered body and further achieve an improvement in burned body strength, particularly in burned body flexural strength (bending strength). In particular, the flexural strength becomes more important following reduction in size and thickness of a chip inductor.

SUMMARY OF THE INVENTION

For accomplishing the foregoing object, according to one aspect of the present invention, there is obtained a NiCuZn-based ferrite material containing, as main components, 43.0 to 49.8 mol % of iron oxide in terms of $Fe_2O_3$, 5.0 to 14.0 mol % of copper oxide in terms of CuO, 3.0 to 32.0 mol % of zinc oxide in terms of ZnO, and remaining mol % of nickel oxide in terms of NiO, wherein 0.05 to 1.0 wt % of bismuth oxide in terms of $Bi_2O_3$, 0.5 to 3.0 wt % of tin oxide in terms of $SnO_2$, and 30 to 5000 wt ppm of chromium oxide in terms of $Cr_2O_3$ are added to the main components.

According to another aspect of the present invention, there is obtained an electronic component comprising a NiCuZn-based ferrite material, wherein the NiCuZn-based ferrite material contains, as main components, 43.0 to 49.8 mol % of iron oxide in terms of $Fe_2O_3$, 5.0 to 14.0 mol % of copper oxide in terms of CuO, 3.0 to 32.0 mol % of zinc oxide in terms of ZnO, and remaining mol % of nickel oxide in terms of NiO, and wherein 0.05 to 1.0 wt % of bismuth oxide in terms of $Bi_2O_3$, 0.5 to 3.0 wt % of tin oxide in terms of $SnO_2$, and 30 to 5000 wt ppm of chromium oxide in terms of $Cr_2O_3$ are added to the main components.

As a preferred mode of the present invention, the electronic component is configured as a multilayer inductor or a multilayer LC composite component comprising a coil conductor and a core portion made of the NiCuZn-based ferrite material and forming a closed magnetic circuit.

Since the ferrite material of the present invention is configured such that 0.05 to 1.0 wt % of bismuth oxide in terms of $Bi_2O_3$, 0.5 to 3.0 wt % of tin oxide in terms of $SnO_2$, and 30 to 5000 wt ppm of chromium oxide in terms of $Cr_2O_3$ are added to the predetermined main component mixture composition, it is possible to achieve an improvement in DC bias characteristics, an improvement in temperature characteristics of initial magnetic permeability, and an improvement in resistivity and further achieve an improvement in burned body strength, particularly in burned body flexural strength (bending strength). Further, because of the improvement in flexural strength, it is possible to provide a small-size and thin chip inductor.

DETAILED DESCRIPTION OF THE INVENTION

Now, a ferrite material (oxide magnetic material) of the present invention will be described in detail.

The ferrite material of the present invention is a NiCuZn-based ferrite material containing, as substantial main components, 43.0 to 49.8 mol % (particularly preferably 45 to 49.5 mol %) of iron oxide in terms of $Fe_2O_3$, 5.0 to 14.0 mol % (particularly preferably 7.0 to 12 mol %) of copper oxide in terms of CuO, 3.0 to 32.0 mol % (particularly preferably 14.0 to 28.0 mol %) of zinc oxide in terms of ZnO, and remaining mol % of nickel oxide in terms of NiO.

Further, in the ferrite material of the present invention, 0.05 to 1.0 wt % (particularly preferably 0.1 to 0.7 wt %) of bismuth oxide in terms of $Bi_2O_3$, 0.5 to 3.0 wt % (particularly preferably 1.0 to 2.5 wt %) of tin oxide in terms of $SnO_2$, and 30 to 5000 wt ppm (particularly preferably 100 to 3000 wt ppm) of chromium oxide in terms of $Cr_2O_3$ are added to the foregoing main components as auxiliary components.

With respect to the foregoing composition range of the main components, when the content of iron oxide ($Fe_2O_3$) becomes less than 43 mol %, there tends to occur a disadvantage that the initial magnetic permeability decreases or the resistivity decreases. On the other hand, when the content of iron oxide ($Fe_2O_3$) exceeds 49.8 mol %, there occurs a disadvantage that the degree of sintering decreases so that the flexural strength decreases.

Further, with respect to the foregoing composition range of the main components, when the content of copper oxide (CuO) becomes less than 5.0 mol %, there tends to occur a disadvantage that the degree of sintering decreases so that the flexural strength decreases. On the other hand, when the content of copper oxide (CuO) exceeds 14.0 mol %, there tends to occur a disadvantage that the change in temperature characteristics increases to make it difficult to achieve practical use.

Further, with respect to the foregoing composition range of the main components, when the content of zinc oxide (ZnO) becomes less than 3.0 mol %, there tends to occur a disadvantage that the resistivity value decreases. On the other hand, when the content of zinc oxide (ZnO) exceeds 32.0 mol %, there tends to occur a disadvantage that the Curie temperature becomes 100° C. or less to make it difficult to achieve practical use.

On the other hand, with respect to the foregoing composition range of the auxiliary components contained with respect to the main components, when the content of bismuth oxide ($Bi_2O_3$) becomes less than 0.05 wt %, there tends to occur a disadvantage that the degree of sintering decreases and the resistivity decreases. The flexural strength also decreases. On the other hand, when the content of bismuth oxide ($Bi_2O_3$) exceeds 1.0 wt %, there tends to occur a disadvantage that crystal grains are subjected to abnormal grain growth so that the temperature characteristics and the DC bias characteristics are degraded.

Further, with respect to the foregoing composition range of the auxiliary components contained with respect to the main components, when the content of tin oxide ($SnO_2$) becomes less than 0.5 wt %, there tends to occur a disadvantage that the temperature characteristics and the DC bias characteristics are considerably degraded to make it difficult to achieve practical use. The flexural strength also decreases. On the other hand, when the content of tin oxide ($SnO_2$) exceeds 3.0 wt %, there tends to occur a disadvantage that the degree of sintering considerably decreases so that the flexural strength decreases.

Further, with respect to the foregoing composition range of the auxiliary components contained with respect to the main components, when the content of chromium oxide ($Cr_2O_3$) becomes less than 30 wt ppm, there tends to occur a disadvantage that the flexural strength cannot be improved. On the other hand, when the content of chromium oxide ($Cr_2O_3$) exceeds 5000 wt ppm, there tends to occur a disadvantage that the degree of sintering decreases.

In this invention, in addition to the foregoing auxiliary components, an additional component such as $Mn_3O_4$ or $ZrO_2$ can be added to the foregoing main components. The allowed addition amount range is set to a range that does not impede the operation and effect of this invention.

The ferrite material of the present invention is, for example, molded to a core member having a predetermined shape and wound with a necessary coil, then subjected to resin molding (resin coating) so as to be used as a fixed inductor, a chip inductor, or the like. This is used as an electronic component in, for example, a television, a video recorder, a mobile communication device such as a portable telephone or a car telephone, or the like. The shape of the core is not particularly limited but, for example, a drum core having an outer diameter and a length each being 2 mm or less can be given as an example.

As a resin for use as a mold material (coating material), a thermoplastic or thermosetting resin can be cited. More specifically, there can be cited polyolefin, polyester, polyamide, polycarbonate, polyurethane, phenol resin, urea resin, epoxy resin, and so on. As specific means for molding the mold material, use can be made of dipping, application, spraying, or the like. Further, use may be made of injection molding, cast molding, or the like.

To give an example of a structure of a chip inductor (electronic component) using the ferrite material of the present invention, the chip inductor comprises, for example, a core formed into a cylindrical shape with large-diameter flanges at both ends thereof by the use of the ferrite material of the present invention, a coil wound around the body of the core, terminal electrodes disposed at both ends of the core for connecting end portions of the coil to an external electrical circuit and fixing the core in a mold resin, and the mold resin formed so as to cover the exterior of them.

The ferrite material of the present invention can also be a core material of a multilayer electronic component formed by stacking in layers magnetic body sheets or dielectric sheets applied with predetermined processing and burning them, i.e. a multilayer inductor or a multilayer LC composite component. The multilayer inductor can be formed by preparing a plurality of ferrite composition sheets each formed with an inner conductor for formation of a coil-shaped portion and stacking them in layers and burning them.

Now, description will be made about one example of a method of manufacturing the ferrite material of the present invention.

At first, there are prepared main component materials and auxiliary component materials (additives) that are compounded in predetermined amounts so as to fall within a predetermined range of the present invention.

Then, the prepared materials are wet-mixed together by the use of, for example, a ball mill. The mixture is dried and then calcined. The calcination is carried out in an oxidizing atmosphere, for example, in the air. It is preferable to set a calcination temperature to 500 to 900° C. and a calcination time to 1 to 20 hours. Then, the obtained calcination composite is ground to a predetermined size by the use of a ball mill or the like. In the case of the ferrite material of the present invention, it is preferable that the auxiliary component materials be added and mixed at the time of the grinding (or after the grinding).

After grinding the calcination composite, a suitable binder such as polyvinyl alcohol is added in a proper amount so as to mold it into a desired shape.

Then, the molded composite is burned. The burning is carried out in an oxidizing atmosphere, normally in the air. The burning temperature is set to about 800 to 1000° C. and the burning time is set to about 1 to 5 hours.

EXAMPLE

Hereinbelow, a specific example will be given to describe the present invention in further detail.

Materials of $Fe_2O_3$, $NiO$, $CuO$, and $ZnO$ were compounded in predetermined amounts as main components in compositions so as to achieve composition ratios shown in Table 1 below and then wet-mixed for about 16 hours by the use of a ball mill.

These mixed powders were dried and then calcined in the air at 750° C. for 10 hours, thereby obtaining calcination powders. Then, materials of $Bi_2O_3$, $SnO_2$, and $Cr_2O_3$ as auxiliary components were added in predetermined amounts to the calcination powders so as to achieve composition ratios shown in Table 1 below and then were ground for 72 hours by the use of a steel ball mill, thereby obtaining ground powders.

A 6% polyvinyl alcohol solution was added to the thus obtained ground powders (ferrite powders) and mixed together and then granulated powders were obtained by the use of a spray dryer. The thus obtained granulated powders were molded into a toroidal shape having an outer diameter of 13 mm, an inner diameter of 6 mm, and a height of 3 mm with a mold density of 3.10 $Mg/m^3$. The thus obtained molded articles were burned in the atmosphere at 900° C. for 2 hours, thereby obtaining toroidal core samples.

With respect to these samples, (1) Sintering Density $d_f$, (2) Change Rate of Initial Magnetic Permeability ($\mu i$) at 100 kHz (Temperature Dependency of $\mu i$), (3) DC Bias Characteristics, (4) Resistivity Value, and (5) Flexural Strength were measured.

The measurement of (1) to (5) was implemented in the following manner.

(1) Sintering Density

The density ($d_f$; unit is $Mg/m^3$) of the sintered body was calculated on the basis of a numerical value obtained by the use of the Archimedes' method.

(2) Change Rate of Initial Magnetic Permeability ($\mu i$) at 100 kHz

After winding a wire 20 times around the toroidal core sample, the inductance value and so on were measured by the use of an LCR meter, thereby deriving the change rates of initial magnetic permeability ($\mu i$) at –50° C. to 25° C. and 25° C. to 85° C. at 100 kHz, respectively (a room temperature of 25° C. is used as a reference).

The initial magnetic permeability ($\mu i$) is proportional to the inductance (L) and data in Table 1 below are indicated in terms of L.

That is, $$\Delta L/L(-50° C. \text{ to } 25° C.)=\{L(-50° C.)-L(25° C.)\}/L(25° C.)\times 100(\%)$$

$$\Delta L/L(25° C. \text{ to } 85° C.)=\{L(85° C.)-L(25° C.)\}/L(25° C.)\times 100(\%)$$

(3) DC Bias Characteristics

The change of $\mu$ was measured when a direct current was supplied to the toroidal core sample with a wire wound 20 times therearound and a relationship between $\mu$ and the direct current was given as a graph. Then, a current value $I_{dc10\%down}$(mA) with a 10% reduction of the initial magnetic permeability $\mu i$ was derived according to a technique that calculates a current value, by the use of the graph, obtained when the initial magnetic permeability $\mu i$ at the time of the direct current being 0 mA decreases by 10%.

(4) Resistivity Value

After applying electrodes to the disk-shaped sample, the resistance thereof was measured by the use of an IR meter and then the resistivity $\rho$ was calculated on the basis of the size.

(5) Flexural Strength Test (Fine Ceramics Bending Strength Test)

This is a three-point bending test for fine ceramics at ordinary temperature and the flexural strength is derived pursuant to JIS R1601$_{1981}$. As a numerical value increases, the flexural strength increases.

The results are shown in Table 1 below. With respect to data in Table 1, target values are such that the sintering density $d_f$ is 4.95 ($Mg/m^3$) or more, the current value $I_{dc10\%down}$ of DC bias characteristics is 300 mA or more, the resistivity $\rho$ is $10^5 \Omega \cdot m$ or more, an absolute value of $\Delta L/L(-50° C. \text{ to } 25° C.)$ is 10% or less, an absolute value of $\Delta L/L(25° C. \text{ to } 85° C.)$ is 10% or less, and the flexural strength is 15 $kg/mm^2$ or more.

TABLE 1

| Sample No. | Main Component (mol %) Fe$_2$O$_3$ | CuO | ZnO | NiO | Auxiliary Component (Adding Component) Bi$_2$O$_3$ (wt %) | SnO$_2$ (wt %) | Cr$_2$O$_3$ (wtppm) | Sintering Density d$_f$ (Mg/m$^3$) | ΔL/L (−50~ 25° C.) (%) | ΔL/L (25~ 85° C.) (%) | I$_{dc10\% \text{ down}}$ (mA) | Resistivity Value ρ (Ω·m) | Flexural Strength (kg/mm$^2$) |
|---|---|---|---|---|---|---|---|---|---|---|---|---|---|
| 1 | 47.3 | 8.8 | 18.0 | 25.9 | 0.31 | 1.0 | 1500 | 4.97 | 1.0 | −1.5 | 660 | 7.94 × 10$^6$ | 15.0 |
| 2 | 47.3 | 8.8 | 18.0 | 25.9 | 0.5 | 0.5 | 1500 | 5.10 | −9.7 | 6.8 | 360 | 9.54 × 10$^5$ | 15.5 |
| 3 (Comparative) | 47.3 | 8.8 | 18.0 | 25.9 | 1.5 | 0.5 | 1500 | 5.20 | −11.7 | 7.5 | 222 | 6.80 × 10$^5$ | 16.5 |
| 4 (Comparative) | 47.3 | 8.8 | 18.0 | 25.9 | 0.03 | 1.5 | 1500 | 4.60 | −1.4 | 1.3 | 725 | 6.59 × 10$^4$ | 12.5 |
| 5 (Comparative) | 47.3 | 8.8 | 18.0 | 25.9 | 0.31 | 4.0 | 1500 | 3.89 | 0 | −2.3 | 900 | 9.05 × 10$^4$ | 10.4 |
| 6 (Comparative) | 47.3 | 8.8 | 18.0 | 25.9 | 0.5 | 0.2 | 1500 | 4.95 | −14.9 | 13.0 | 240 | 4.40 × 10$^5$ | 14.2 |
| 7 (Comparative) | 48.2 | 8.8 | 17.1 | 25.9 | — | — | 20 | 5.11 | −15.7 | 13.6 | 273 | 4.80 × 10$^5$ | 17.4 |
| 8 (Comparative) | 48.2 | 8.8 | 17.1 | 25.9 | 0.31 | 1.5 | 20 | 5.02 | −1.2 | 0.0 | 491 | 4.62 × 10$^6$ | 13.2 |
| 9 | 48.2 | 8.8 | 17.1 | 25.9 | 0.31 | 1.5 | 100 | 5.06 | −2.1 | −0.2 | 492 | 2.94 × 10$^5$ | 15.2 |
| 10 | 48.2 | 8.8 | 17.1 | 25.9 | 0.31 | 1.5 | 700 | 5.04 | −2.3 | 0.0 | 500 | 2.71 × 10$^6$ | 16.5 |
| 11 | 48.2 | 8.8 | 17.1 | 25.9 | 0.31 | 1.5 | 1500 | 4.97 | −1.9 | −0.1 | 546 | 2.49 × 10$^5$ | 17.7 |
| 12 | 48.2 | 8.8 | 17.1 | 25.9 | 0.31 | 1.5 | 3000 | 5.03 | −1.8 | 0.1 | 500 | 3.42 × 10$^6$ | 16.3 |
| 13 | 48.2 | 8.8 | 17.1 | 25.9 | 0.31 | 1.5 | 5000 | 4.98 | −1.8 | 0.1 | 467 | 4.82 × 10$^6$ | 16.8 |
| 14 (Comparative) | 48.2 | 8.8 | 17.1 | 25.9 | 0.31 | 1.5 | 10000 | 4.81 | −1.8 | 0.1 | 415 | 1.36 × 10$^6$ | 17.1 |
| 15 | 43.0 | 9.0 | 18.0 | 30.0 | 0.31 | 1.5 | 1500 | 5.06 | −9.0 | 5.2 | 630 | 4.50 × 10$^6$ | 16.8 |
| 16 | 49.5 | 9.0 | 18.0 | 23.5 | 0.31 | 1.5 | 1500 | 5.13 | −1.3 | 0.2 | 550 | 3.00 × 10$^5$ | 16.6 |
| 17 (Comparative) | 42.5 | 9.0 | 18.0 | 30.5 | 0.31 | 1.5 | 1500 | 5.14 | −10.3 | 6.2 | 692 | 1.20 × 10$^4$ | 15.4 |
| 18 (Comparative) | 50.0 | 9.0 | 18.0 | 23.0 | 0.31 | 1.5 | 1500 | 4.70 | −1.0 | 0.6 | 820 | 1.84 × 10$^4$ | 12.1 |
| 19 | 48.0 | 5.5 | 18.0 | 28.5 | 0.31 | 1.5 | 1500 | 5.12 | −5.4 | 3.9 | 608 | 3.60 × 10$^6$ | 15.8 |
| 20 | 48.0 | 11.5 | 18.0 | 22.5 | 0.31 | 1.5 | 1500 | 5.10 | −1.9 | 2.4 | 622 | 6.90 × 10$^6$ | 15.9 |
| 21 (Comparative) | 48.0 | 4.0 | 18.0 | 30.0 | 0.31 | 1.5 | 1500 | 4.55 | −2.1 | 1.5 | 875 | 1.01 × 10$^5$ | 11.3 |
| 22 (Comparative) | 48.0 | 15.0 | 18.0 | 19.0 | 0.31 | 1.5 | 1500 | 5.00 | −10.4 | 6.1 | 500 | 9.30 × 10$^4$ | 15.0 |
| 23 | 47.0 | 9.0 | 10.0 | 34.0 | 0.31 | 1.5 | 1500 | 5.05 | −1.0 | 1.1 | 570 | 1.00 × 10$^5$ | 15.9 |
| 24 | 47.0 | 9.0 | 28.0 | 16.0 | 0.31 | 1.5 | 1500 | 5.13 | −2.0 | 2.0 | 399 | 1.80 × 10$^6$ | 15.3 |
| 25 | 47.0 | 9.0 | 7.0 | 37.0 | 0.31 | 1.5 | 1500 | 4.99 | −2.6 | 2.0 | 796 | 9.30 × 10$^5$ | 15.2 |
| 26 | 47.0 | 9.0 | 33.0 | 11.0 | 0.31 | 1.5 | 1500 | 5.15 | −6.0 | 5.0 | 390 | 1.60 × 10$^6$ | 16.4 |
| 27 (Comparative) | 47.0 | 9.0 | 2.0 | 42.0 | 0.31 | 1.5 | 1500 | 4.90 | −3.5 | 4.0 | 990 | 8.00 × 10$^4$ | 14.6 |

* Sample No. 26 is difficult to put to practical use because the Curie temperature is 90° C., i.e. not higher than 100° C.

The effects of the present invention are clear from the foregoing results. That is, in the present invention, 0.05 to 1.0 wt % of bismuth oxide in terms of Bi$_2$O$_3$, 0.5 to 3.0 wt % of tin oxide in terms of SnO$_2$, and 30 to 5000 wt ppm of chromium oxide in terms of Cr$_2$O$_3$ are added to the predetermined main component mixture composition. Therefore, it is possible to achieve an improvement in DC bias characteristics, an improvement in temperature characteristics of initial magnetic permeability, and an improvement in resistivity and, further, the effect is achieved that the flexural strength can be improved.

What is claimed is:

1. A NiCuZn-based ferrite material containing, as main components, 43.0 to 49.8 mol % of iron oxide in terms of Fe$_2$O$_3$, 5.0 to 14.0 mol % of copper oxide in terms of CuO, 3.0 to 32.0 mol % of zinc oxide in terms of ZnO, and remaining mol % of nickel oxide in terms of NiO, wherein 0.05 to 1.0 wt % of bismuth oxide in terms of Bi$_2$O$_3$, 0.5 to 3.0 wt % of tin oxide in terms of SnO$_2$, and 30 to 5000 wt ppm of chromium oxide in terms of Cr$_2$O$_3$ are added to said main components.

2. A NiCuZn-based ferrite material according to claim 1, wherein 0.1 to 0.7 wt % of bismuth oxide in terms of Bi$_2$O$_3$ is added to said main components.

3. A NiCuZn-based ferrite material according to claim 1, wherein 1.0 to 2.5 wt % of tin oxide in terms of SnO$_2$ is added to said main components.

4. A NiCuZn-based ferrite material according to claim 1, wherein 100 to 3000 wt ppm of chromium oxide in terms of Cr$_2$O$_3$ is added to said main components.

5. An electronic component comprising a NiCuZn-based ferrite material,
wherein said NiCuZn-based ferrite material contains, as main components, 43.0 to 49.8 mol % of iron oxide in terms of Fe$_2$O$_3$, 5.0 to 14.0 mol % of copper oxide in terms of CuO, 3.0 to 32.0 mol % of zinc oxide in terms of ZnO, and remaining mol % of nickel oxide in terms of NiO, and
wherein 0.05 to 1.0 wt % of bismuth oxide in terms of Bi$_2$O$_3$, 0.5 to 3.0 wt % of tin oxide in terms of SnO$_2$, and 30 to 5000 wt ppm of chromium oxide in terms of Cr$_2$O$_3$ are added to said main components.

6. An electronic component according to claim 5, wherein said electronic component is a multilayer inductor or a multilayer LC composite component comprising a coil conductor and a core portion made of said NiCuZn-based ferrite material and forming a closed magnetic circuit.

* * * * *